United States Patent

Mao

[11] Patent Number: 5,879,834
[45] Date of Patent: Mar. 9, 1999

[54] POLYMERIZABLE AROMATIC ADDITIVES FOR OVERCHARGE PROTECTION IN NON-AQUEOUS RECHARGEABLE LITHIUM BATTERIES

[75] Inventor: Huanyu Mao, Burnaby, Canada

[73] Assignee: NEC Moli Energy (Canada) Ltd., Maple Ridge, Canada

[21] Appl. No.: 681,171

[22] Filed: Jul. 22, 1996

[30] Foreign Application Priority Data

Aug. 23, 1995 [CA] Canada ................................... 2156800

[51] Int. Cl.⁶ .................................................. H01M 10/40
[52] U.S. Cl. .......................................... 429/197; 429/194
[58] Field of Search ...................... 429/197, 194

[56] References Cited

U.S. PATENT DOCUMENTS

| 4,489,145 | 12/1984 | Abraham et al. . |
| 4,943,497 | 7/1990 | Oishi et al. . |

FOREIGN PATENT DOCUMENTS

| 614239 | 7/1994 | European Pat. Off. . |
| 0 746 050 | 12/1996 | European Pat. Off. . |
| 61-147475 | 7/1986 | Japan . |
| 61-230276 | 10/1986 | Japan . |
| 4-249870 | 9/1992 | Japan . |
| 4-272659 | 9/1992 | Japan . |
| 4-332479 | 11/1992 | Japan . |
| 7-302614 | 11/1995 | Japan . |
| WO 95/21467 | 10/1995 | WIPO . |

OTHER PUBLICATIONS

Matsuda et al., *Journal of Power Sources*, 54(2) Apr. (1995) 301–305.

Waltman, et al., "Electroactive Properties of Polyaromatic Molecules", J. Electrochem. Soc., vol. 131, No. 6, Jun. 1984, pp. 1452–1456.

*Primary Examiner*—John S. Maples
*Attorney, Agent, or Firm*—Synnestvedt & Lechner

[57] ABSTRACT

Non-aqueous rechargeable lithium batteries can be protected against overcharge abuse by incorporating small amounts of suitable aromatic additives into the electrolyte. The additives are electrochemically polymerized at abnormally high voltages, thereby increasing the internal resistance of the battery and thus protecting it. Aromatic additives such as biphenyl, 3-chlorothiophene, and furan are particularly suitable for certain lithium ion batteries. The additives need not and may preferably not polymerize during overtemperature abuse.

92 Claims, 4 Drawing Sheets

POLYMERIZABLE AROMATIC ADDITIVES FOR OVERCHARGE PROTECTION IN NON-AQUEOUS RECHARGEABLE LITHIUM BATTERIES

FIELD OF THE INVENTION

This invention pertains to non-aqueous rechargeable lithium batteries and to methods for improving the safety thereof. Specifically, it pertains to the use of polymerizable aromatic additives as means for providing overcharge protection in lithium ion batteries.

BACKGROUND OF THE INVENTION

The demand for rechargeable batteries having ever greater energy density has resulted in substantial research and development activity in rechargeable lithium batteries. The use of lithium is associated with high energy density, high battery voltage, long shelf life, but also with safety problems (ie. fires). As a result of these safety problems, many rechargeable lithium battery electrochemistries and/or sizes are unsuitable for use by the public. In general, batteries with electrochemistries employing pure lithium metal or lithium alloy anodes are only available to the public in very small sizes (eg. coin cell size) or are primary types (eg. non-rechargeable). However, larger rechargeable batteries having such electrochemistries can serve for military or certain remote power applications where safety concerns are of somewhat lesser importance.

Recently, a type of rechargeable lithium battery known as lithium-ion or 'rocking chair' has become available commercially and represents a preferred rechargeable power source for many consumer electronics applications. These batteries have the greatest energy density (Wh/L) of presently available conventional rechargeable systems (ie. NiCd, NiMH, or lead acid batteries) Additionally, lithium ion batteries operate around 3½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The excellent reversibility of this insertion makes such compounds function extremely well in rechargeable battery applications wherein thousands of battery cycles can be obtained. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with the associated electrons travelling in the circuit external to the battery.

3.6 V lithium ion batteries based on $LiCoO_2$/pregraphitic carbon electrochemistry are now commercially available (eg. products of Sony Energy Tec. or A&T Battery). Many other lithium transition metal oxide compounds are suitable for use as cathode material, including $LiNiO_2$ (described in U.S. Pat. No. 4,302,518) and $LiMn_2O_4$ (described in U.S. Pat. No. 4,507,371). Also, a wide range of carbonaceous compounds is suitable for use as the anode material, including coke (described in U.S. Pat. No. 4,725,422) and pure graphite (described in U.S. Pat. No. 4,423,125). The aforementioned products employ non-aqueous electrolytes comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

Lithium ion batteries can be sensitive to certain types of abuse, particularly overcharge abuse wherein the normal operating voltage is exceeded during recharge. During overcharge, excessive lithium is extracted from the cathode with a corresponding excessive insertion or even plating of lithium at the anode. This can make both electrodes less stable thermally. Overcharging also results in heating of the battery since much of the input energy is dissipated rather than stored. The decrease in thermal stability combined with battery heating can lead to thermal runaway and fire on overcharge. Many manufacturers have decided to incorporate additional safety devices as a greater level of protection against overcharge abuse. For instance, the aforementioned products of Sony incorporate an internal disconnect device which activates during overcharge abuse (as described in U.S. Pat. No. 4,943,497). Such devices can be effective, but their incorporation introduces additional cost and reliability problems pertaining to the device and its operation. More importantly, the contents of the battery are left in a less thermally stable state, thereby making them more sensitive to mechanical abuse. Internally disconnected batteries cannot be externally discharged to drain them of energy for purposes of safer disposal.

In European Patent Application No. 614,239, Tadiran disclose a method for protecting non-aqueous rechargeable lithium batteries against both overcharge and overtemperature abuse via use of a polymerizing electrolyte. The liquid electrolyte polymerizes at battery voltages greater than the maximum operating voltage or maximum operating temperature of the battery thereby increasing the internal resistance of the battery and protecting the battery. The method is suitable for lithium batteries employing pure lithium metal, lithium alloy, and/or lithium insertion compound anodes. Therein, many requirements are imposed on the bulk electrolyte characteristics simultaneously. The bulk electrolyte must provide acceptable battery performance and yet also serve to provide protection against overcharge and overtemperature abuse. It can be very difficult to identify bulk electrolytes that adequately meet all these requirements and even more difficult to obtain close to optimal results in each case. For example, polymerization may not occur at both the preferred voltage and the preferred temperature. Thus, the operating range of the battery may be restricted undesirably or the preferred safety characteristics may not be obtained. In turn therefore, it may be preferred to provide overcharge and overtemperature protection via independent means.

In the art, it is common to protect against overtemperatures that originate from some types of electrical abuse (eg. short circuit) by using a suitable separator that melts or shuts down at a specific temperature (the shutdown temperature). During short circuit abuse, the internal resistance of the battery increases markedly when the separator melts, thereby protecting the battery. Microporous polyolefin separators are suitable for this purpose. Microporous polypropylene and polyethylene separators, having shutdown temperatures about 155° C. and 125° C. respectively, are commonly employed in lithium batteries.

The preferred embodiment in the aforementioned European Application employs an electrolyte comprising 1,3 dioxolane solvent and $LiAsF_6$ salt in a battery normally charged to 3.4 volts. The preferred embodiment further required a polymerization inhibitor to prevent undesirable polymerization during normal operation. Suitable electrolytes for use in higher voltage batteries (such as typical commercial lithium ion batteries) were not identified.

It is known in the art that certain aromatic compounds, including heterocyclic compounds, can be polymerized electrochemically (eg. R. J. Waltman et al. investigated the properties of electropolymerized polythiophene in J. Electrochem. Soc., 131 (6), 1452–6, 1984.) Additionally, polymers of certain heterocyclic compounds have been used as electrodes in the development of various electrochemical devices including lithium batteries (eg. as in Japanese Patent Application Laid-open No. 04-272659 of Matsushita).

Some aromatic compounds have been used in electrolyte solvent mixtures and/or as electrolyte solvent additives in certain specific rechargeable non-aqueous lithium batteries. For instance, toluene has been used as an electrolyte solvent and/or electrolyte additive to enhance cycle life (as in Japanese Patent Application Laid-open No. 04-249870) and/or provide a means for activating an internal disconnect device (similar to that described in U.S. Pat. No. 4,943,497 above) on overcharge (as in Japanese Patent Application Laid-open No. 04-332479). No mention is made in any of these applications about potential safety advantages resulting from the electrochemical polymerization capability of the additives. It is unclear whether the actual embodiments in these applications would possess a safety advantage in practice during overcharge abuse as a result of a polymerization of the additives (ie. other events that occur during overcharge might prevent polymerization, such as an earlier activation of the internal disconnect device in the latter Japanese Application, and/or polymerization might not result in an observed safety improvement).

Additionally, some aromatic heterocyclic compounds have been used as electrolyte solvent additives for purposes of enhancing cycle life in certain specific rechargeable non-aqueous lithium batteries. In Japanese Patent Application Laid-open No. 61-230276, a laboratory test cell employing an electrolyte comprising a furan solvent additive demonstrated an improved cycling efficiency for plated lithium metal. In Japanese Patent Application Laid-open No. 61-147475, a polyacetylene anode, $TiS_2$ cathode battery employing an electrolyte comprising a thiophene solvent additive showed better cycling characteristics than similar batteries without the additive. No mention is made in either of these applications about potential safety advantages resulting from the electrochemical polymerization capability of the additives. Also, it is unclear whether the actual embodiments in these applications would possess a safety advantage in practice during overcharge abuse as a result of incorporating the additives (ie. other events that occur during overcharge might prevent polymerization and/or polymerization might not result in an observed safety improvement).

SUMMARY OF THE INVENTION

Certain non-aqueous rechargeable lithium batteries having liquid electrolytes can be protected against overcharge abuse by using small amounts of aromatic compounds as an electrolyte additive therein. Thus, the invention comprises both methods for providing overcharge protection utilizing such aromatic additives and battery embodiments incorporating such additives.

Generally, these batteries comprise a lithium insertion compound cathode, a lithium compound anode (eg. lithium metal, lithium alloy, or lithium insertion compound), a separator, and a non-aqueous liquid electrolyte. As shown in the prior art, a battery can be protected during overcharge abuse if the bulk non-aqueous liquid electrolyte polymerizes at voltages greater than the normal maximum operating voltage of the battery thereby increasing the internal resistance of the battery. However, if the bulk non-aqueous liquid electrolyte is incapable of polymerizing under these conditions such that the battery is protected, we have discovered that a small amount of polymerizable aromatic additive mixed in the liquid electrolyte can be used instead. The small amount can be sufficient to protect the battery during overcharge abuse. Thus, the aromatic additive polymerizes at voltages greater than the maximum operating voltage thereby increasing the internal resistance of the battery sufficiently for protection. Bulk electrolytes having other desirable properties can thus be employed without sacrificing this desirable overcharge protection.

We have discovered that aromatic compounds are particularly suitable as additives. Amounts of aromatic additive ranging from about 1% to 4% by volume in the electrolyte/additive mixture can be sufficient for protection. The aromatic additive can be biphenyl comprising an amount about 2.5% by weight of the electrolyte/additive mixture. Alternatively, the aromatic additive can be 3-R-thiophene wherein R is a halogen selected from the group consisting of bromo, chloro, or fluoro. A preferred additive is 3-chlorothiophene comprising an amount in the range from about 2% to about 4% by volume of the electrolyte/additive mixture. Still further, the additive can be furan, preferably comprising about 1% furan by volume of the mixture.

Batteries of the invention can have maximum operating charging voltages greater than 4 volts as is typical for lithium ion batteries. The lithium insertion compound cathode can be $Li_xMn_2O_4$, or alternately can be selected from the group consisting of $Li_xCoO_2$ and $Li_xNiO_2$. The lithium compound anode can be a carbonaceous insertion compound. The liquid electrolyte solvent can comprise ethylene carbonate and diethyl carbonate, and also methylethyl carbonate. The liquid electrolyte solute can comprise $LiPF_6$.

Both overcharge and overtemperature protection can be obtained in batteries of the invention if the separator therein has a shutdown temperature such that the internal resistance of the battery is increased when the battery temperature exceeds the shutdown temperature thereby protecting the battery during thermal abuse, and if the aromatic additives employed do not polymerize below the shutdown temperature. Thus, the characteristics of both protection features can be selected or varied independently. The separator employed in such a case can be similar to those of conventional lithium batteries, ie. a microporous polyolefin film wherein the shutdown temperature is about the melting point of the polyolefin. The polyolefin can be selected from the group consisting of polypropylene and polyethylene.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Figure 1:
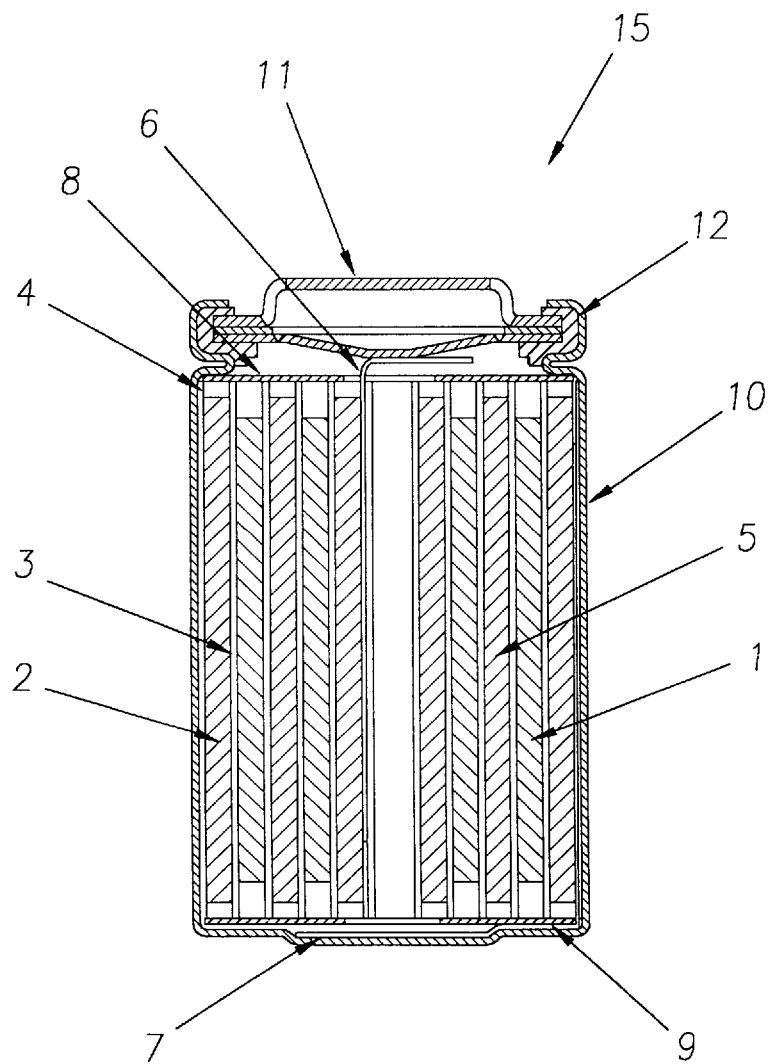
FIG. 1 depicts a cross-sectional view of a preferred embodiment of a cylindrical spiral-wound lithium ion battery.

The design of all non-aqueous rechargeable batteries involves tradeoffs between performance characteristics and safety characteristics. Often, certain non-aqueous electrolytes provide substantially improved performance over other much safer electrolyte choices. For this reason, it is highly desirable to be able to provide these characteristics as independently as possible. Usually, a mixture of two electrolytes in amounts of similar magnitude (perhaps one for performance and one for safety) results in net characteristics that are far below the optimal expectations of each individual electrolyte. Often however, small amounts of additives can be employed to serve a function without substantially affecting the other characteristics of the bulk electrolyte. Herein, it is shown how overcharge protection can be provided in certain non-aqueous rechargeable batteries by incorporating a small amount of a suitable aromatic additive in the electrolyte.

As discussed in *Organic Chemistry* by R. J. Fessenden et al., Willard Grant Press, 1979, the term aromatic refers to a class of ring compounds that are substantially stabilized by pi-electron delocalization. Such compounds are cyclic, planar, and each atom in the ring has a p orbital perpendicular to the plane of the ring ($sp^2$-hybrid state). Also, the ring system must have 4n+2 pi electrons where n is an integer (the Huckel rule). The term heterocyclic (see *The Condensed Chemical Dictionary* 9th Ed., G. G. Hawley, Van Nostrand Reinhold, 1977) denotes a closed-ring structure, usually of either 5 or 6 members, in which one or more of the atoms in the ring is an element other than carbon (eg. sulfur, oxygen, and nitrogen.)

Examples of aromatic homocyclic compounds are toluene, biphenyl and the like. Examples of aromatic heterocyclic compounds are furan, thiophene, and derivatives thereof. The literature provides information on the polymerization potential and other related characteristics of many aromatic compounds, including those that are heterocyclic. Table 1 shows the polymerization potential for several such compounds. Note however that the polymerization potentials depend to some extent on the electrodes and other electrolyte components employed in the electrochemical system. The literature values thus are useful for suggesting potential aromatic compound candidates for the instant application. Under actual battery conditions, a compound may be suitable if it polymerizes at voltages above the maximum operating charging voltage of the battery but below the overcharge voltage at which the battery is hazardous (eg. the voltage during overcharge just prior to catching fire).

TABLE 1

| Aromatic Compound | Polymerization Potential (Volts vs. Li/Li$^+$) | Reference |
|---|---|---|
| Thiophene | 5.34 | 1 |
| 3-Bromothiophene | 5.401 | 1 |
| 3-Chlorothiophene | 5.461 | 1 |
| 3-Fluorothiophene | 5.481 | 1 |
| 1,2-Dimethoxybenzene | 4.937 | 2 |
| 1-methyl-3-(pyrrol-1-ylmethyl) pyrridinium tetrafluoroborate | 4.411 | 3 |
| Furan | 5.20 | 4 |
| Biphenyl | 4.70 | 5 |

References:
1 A.E. Kassmi et al., J. Electroanal. Chem., 373 (1994) 241.
2 O.P. Marquez et al., J. Electrochem. Soc., 142 (1995) 707.
3 H. Mao et al., J. Electroanal. Chem., 265 (1989) 127.
4 Example c) in the Illustrative Examples following.
5 Example vii) in the 18650 Battery Examples following.

Additives meeting the preceding polymerization voltage criteria are thus potentially suitable as overcharge protection additives. However, polymerization may proceed somewhat differently in the actual battery environment. Also, polymerization of the additive may not result in an adequate increase in the internal resistance of the battery and thus may not protect the battery in practice during overcharge. Finally, the amount of the additive must be such that battery performance is otherwise not adversely affected to any significant degree. Suitable additives therefore must be relatively inert with respect to lithium and to the electrodes (ie. should not be capable of reacting with or inserting therein). Also, suitable additives should not substantially cause an increase in the internal resistance or impedance of the battery during normal operation (ie. should not adversely effect the double layer impedance, etc.).

Consequently, in order to establish the parameters of the invention, we have conducted a number of trials in order to determine the suitability of a particular additive candidate for any given battery application. These trials include overcharge testing of trial batteries comprising varied amounts of additive candidate. Either during or after the selecting of an enabling amount of an additive, some performance testing of trial batteries is required to completely test for adverse effects on performance.

With the exception of the presence of the additive, the construction of batteries of the invention is conventional. Generally, an enabling amount of additive is simply mixed in with the bulk electrolyte at some preferred point during normal assembly. Minor handling changes may of course be required to account for differences in the properties of the bulk electrolyte and the additive (eg. vapor pressure, toxicity, etc.).

Non-aqueous rechargeable lithium batteries appear in various configurations commercially (ie. prismatic formats or miniature coin cells) and many different components may be used. A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include additional safety devices if desired. Often, a safety vent is incorporated that ruptures if excessive pressure builds up in the battery. Also, a positive thermal coefficient device (PTC) may be incorporated into the header to limit the short circuit current capability of the battery. The external surface of the header 11 is used as the positive terminal, while the external surface of the can 10 serves as the negative terminal Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4. In batteries of the invention, the electrolyte 5 additionally comprises an amount of polymerizing additive.

On the basis of successful experimental trials (as in the following Examples), we have determined that small amounts of polymerizing additive in the electrolyte can be sufficient to provide overcharge protection in certain lithium ion batteries. Without being bound by theory, adversely or otherwise, polymerization of the additive is believed to occur at the cathode resulting in the formation of insulating polymer on the cathode surfaces. Depending on the nature and effective coverage of the formed polymer, only a thin film may be needed to insulate the cathode and thus substantially raise the internal resistance of the battery. Additionally, in typical lithium ion batteries, the cathode is in close physical contact with a thin, low volume, microporous separator. Additive within the porous, relatively high volume, anode can migrate towards the cathode and polymerize on contact therewith, perhaps resulting in a high concentration of polymer at the separator-cathode interface. Such a high concentration at this interface may block the separator and result in a substantial increase in internal resistance of the battery, even though only a relatively small amount of polymer overall is involved (ie. relative to the bulk electrolyte).

Conversely however, if the polymer forms in a porous fibre like fashion (eg. as does dimethoxybenzene), it may not be effective in impeding transport of ions in the electrolyte or in blocking the interface between cathode and electrolyte. Additionally, some polymers can be reasonably good ion conductors in their own right and serve as bulk electrolytes in certain developmental rechargeable lithium batteries.

Many aromatic compounds nonetheless provide overcharge protection in certain lithium ion type battery applications and thus it is expected that the same compounds can serve to provide similar overcharge protection in other lithium battery systems. (Note that while it is unlikely that such additives would be mobile enough in a polymeric electrolyte to function in all practical situations, it is not inconceivable that even batteries comprising solid polymer electrolytes might achieve some overcharge protection benefits by incorporating such additives.)

Aromatic compounds in general have ring structures that can be fairly easily opened for polymerization electrochemically in a voltage range suitable for application in the instant invention. The presence of foreign atoms in the ring structure of many aromatic heterocyclic compounds makes the neighboring carbon atoms electron rich and hence the ring structure is easily polymerized at these locations. Other unsaturated ring compounds do not polymerize as easily electrochemically. Aromatic compounds are often compatible with lithium battery chemistries in small amounts.

Aromatic compounds do not however typically polymerize at temperatures below an order of 150° C. Thus, polymerization of such aromatic compounds typically does not occur in embodiments of the invention below the normal maximum operating voltage. Thermal polymerization is therefore not a factor in normal operation nor in thermal abuse. Alternative independent means for providing overtemperature protection can thus be employed.

The following Examples are provided to illustrate certain aspects of the invention but should not be construed as limiting in any way. 18650 size (18 mm diameter, 650 mm height) cylindrical batteries were fabricated as described in the preceding discussion and shown generally in FIG. 1. Cathodes 1 comprised a mixture of $LiMn_2O_4$ powder, a carbonaceous conductive dilutant, and polyvinylidene fluoride (PVDF) binder uniformly coated on both sides of a thin aluminum foil about 5.4 cm in width by 49.5 cm in length. Coating weight was about 49 $mg/cm^2$. Anodes 2 were made using a mixture of a spherical graphitic powder plus Super S (trademark of Ensagri) carbon black and polyvinylidene fluoride (PVDF) binder (in amounts of about 2% and 10% by weight respectively to that of the spherical graphitic powder) uniformly coated on thin copper foil of similar length to the cathode but 0.2 mm greater in width. Coating weight was about 19 $mg/cm^2$. Celgard® 2502 microporous polypropylene film was used to form the separators 3. Unless indicated otherwise, the electrolyte 5 was a solution of 1M $LiPF_6$ salt dissolved in a solvent mixture of ethylene carbonate (EC) and diethyl carbonate (DEC) in a EC/DEC volume ratio of 30/70. Approximately 5 cc of electrolyte was used in each battery. The batteries were equipped with a pressure relief vent but no other protection hardware.

For electrical testing, batteries were thermostatted at 21°±1° C. All batteries were initially conditioned by charging, discharging, and then charging again to the normal maximum operating voltage of 4.2 volts. Further cycling was performed where indicated using a current limited, constant voltage charge ( 0.5 A maximum, 4.2 volts) and constant 1 amp current discharge to a 3.0 volt cutoff. Every 20 cycles, a series of discharge currents with decreasing magnitude (1A, 0.5A, 0.25A, 0.125A) was applied in a stepwise fashion for purposes of determining if any observed capacity loss was recovered at a lower discharge rate, ie. a loss in delivered capacity resulting from an impedance buildup.

Figure 2A:
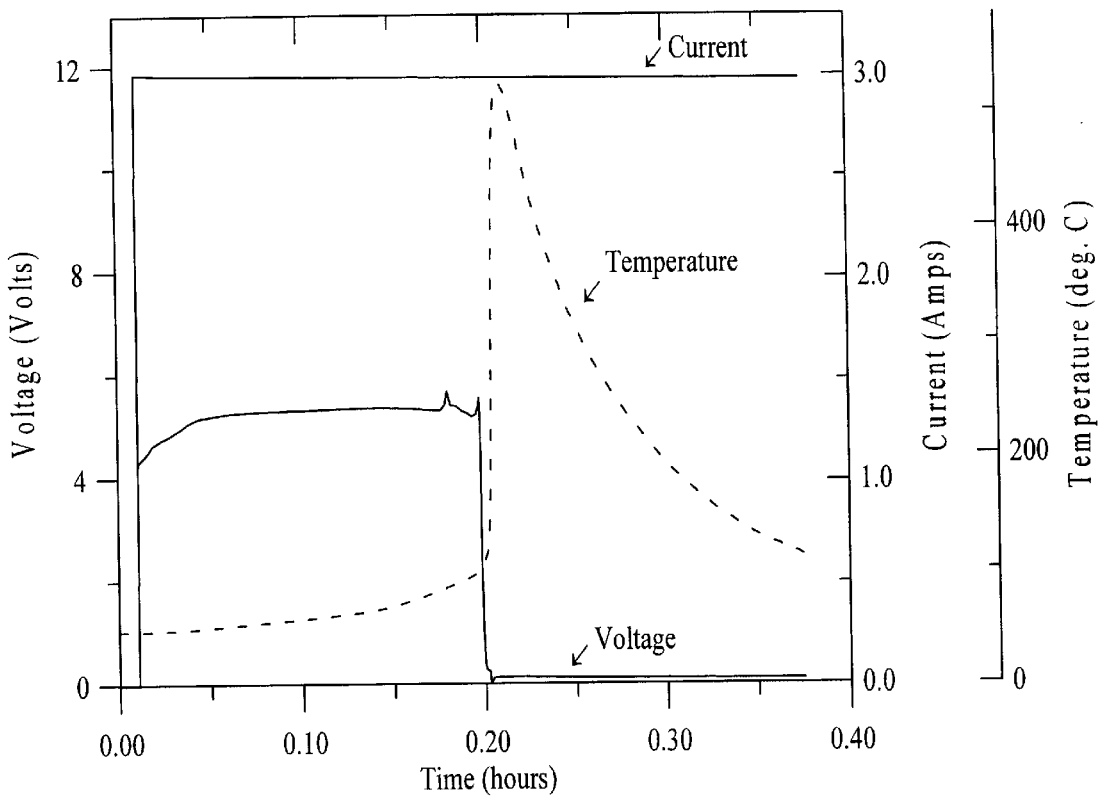
FIGS. 2a and b show the voltage, temperature, and current data during overcharge of a conventional battery in Example i) and of a battery of the invention in Example ii) respectively.
Figure 2B:
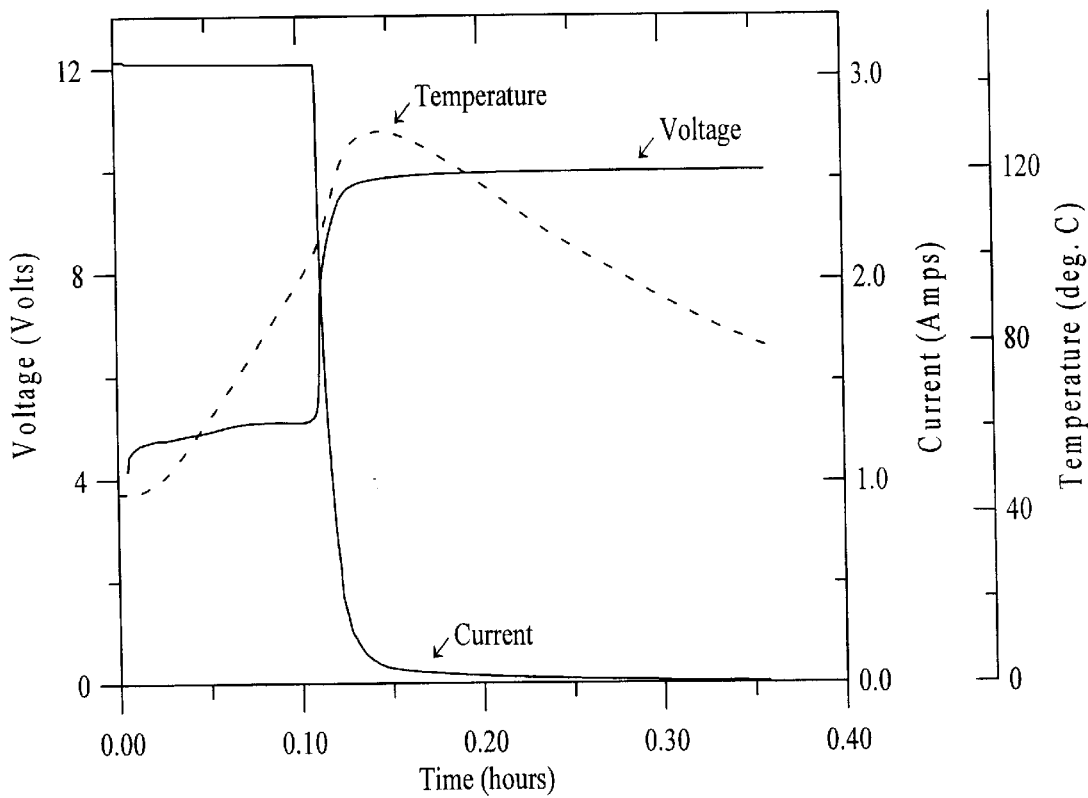
Figure 3:
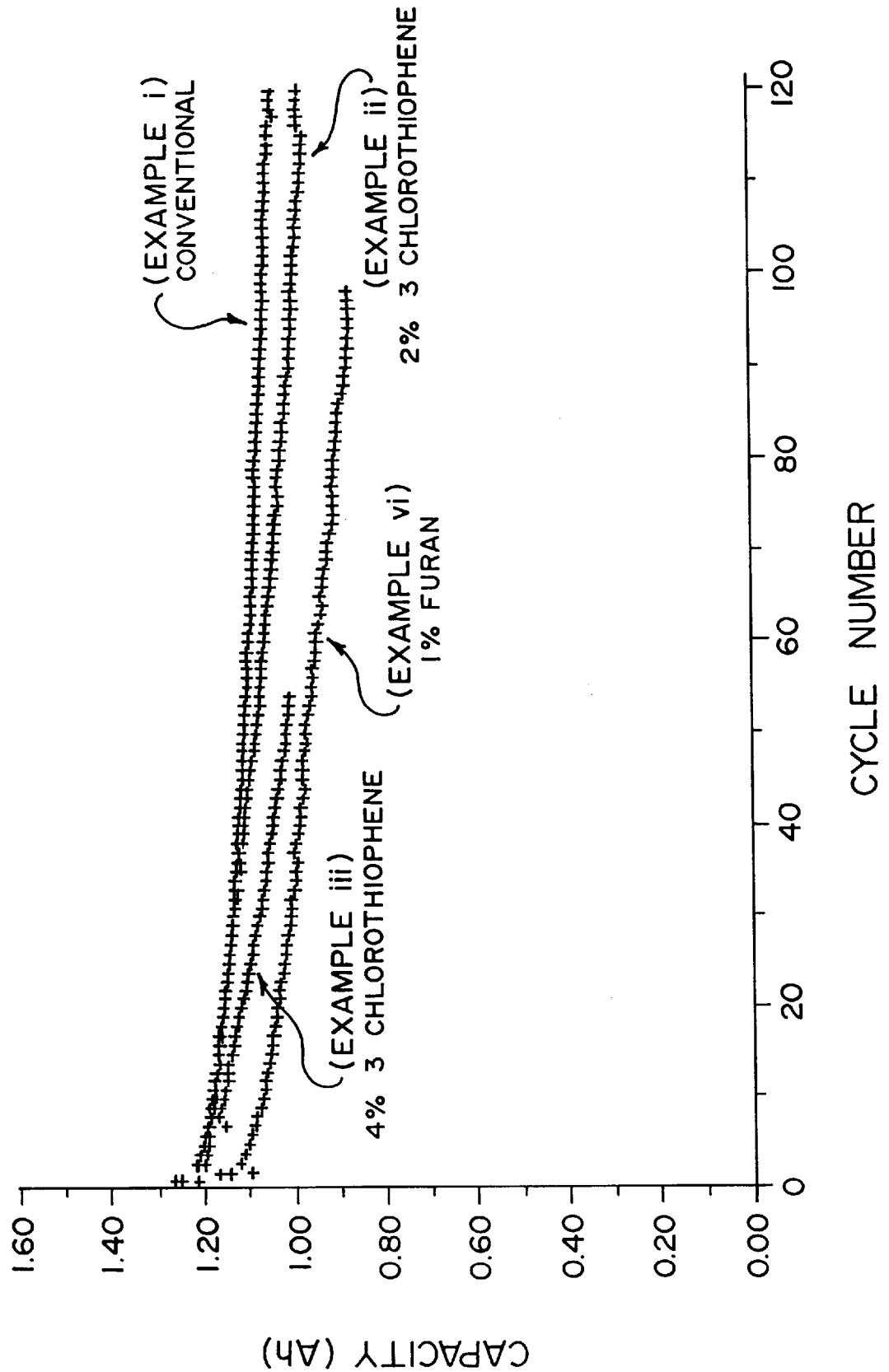
FIG. 3 shows the capacity versus cycle number data for representative batteries of Examples i), ii), iii), and vi).
Figure 4:
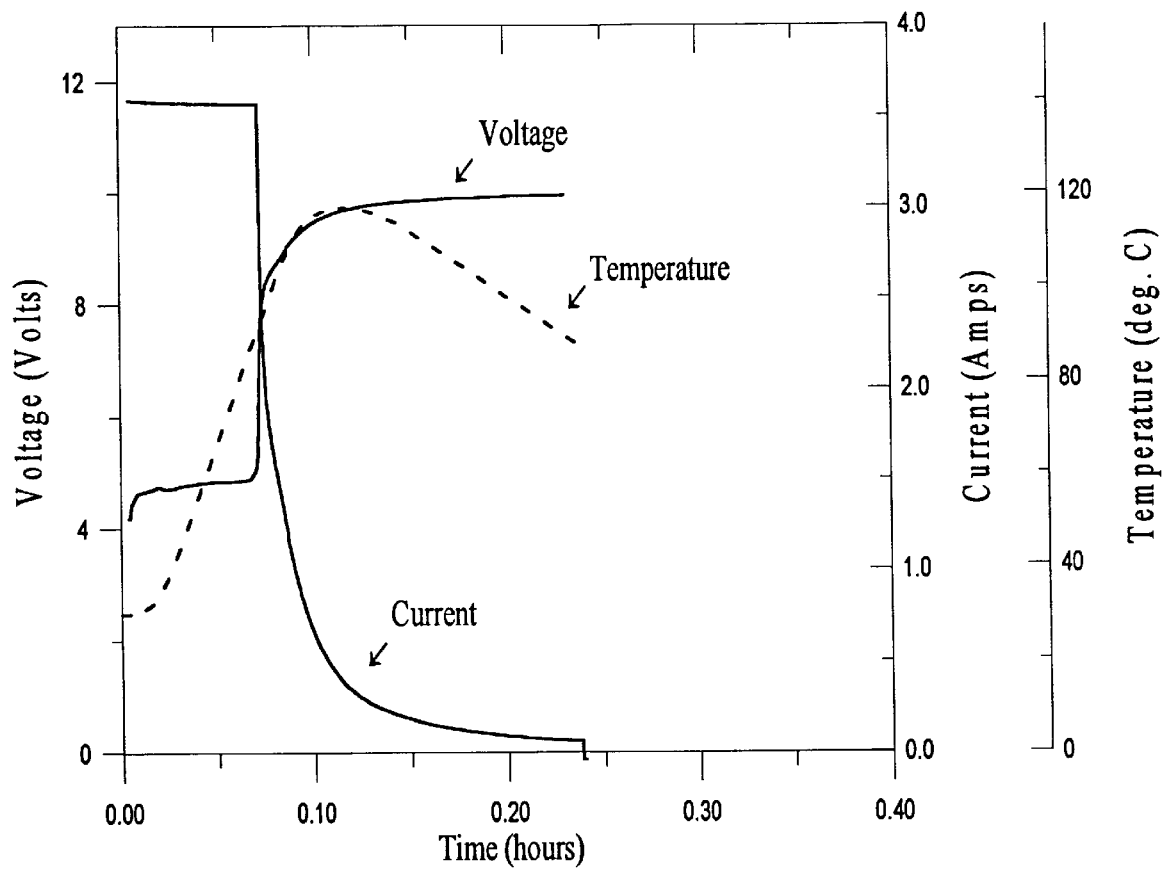
FIG. 4 shows the voltage, temperature and current data during overcharge of a battery of the invention in Example vii).

18650 Battery Examples i) Four conventional 18650 batteries were assembled as described above and overcharge tested at a background temperature of 45° C. using a 3 amp current supply with 10 volt compliance. All batteries vented violently and burned with a substantial flame after about 0.2 hours of overcharging. FIG. 2a shows the voltage, temperature, and current data versus time for a representative conventional battery during overcharge. Just prior to venting violently, the battery voltage was about 5.3 volts. Cycle testing as described above was performed on other conventional batteries. FIG. 3 shows the typical excellent capacity versus cycle number characteristic for one of these.

ii) Four 18650 batteries were assembled and overcharge tested as described in Example i) above except that the electrolyte comprised 2% by volume 3-chlorothiophene additive. When about 4.8 volts was reached during the overcharge, polymerization of the additive began. The internal resistance of the battery increased as evidenced by the rise in battery voltage to the compliance limit. In all cases, no venting nor fire was observed. FIG. 2b shows the voltage, temperature, and current data versus time for a representative battery during overcharge. Cycle testing as in Example i) was performed on two other additive containing batteries. The data for a representative battery is also shown in FIG. 3 and has capacity versus cycle number results that are similar to that of a conventional battery.

iii) Three 18650 batteries were assembled and overcharge tested as described in Example ii) above except that the electrolyte comprised 4% by volume 3-chlorothiophene additive. In all cases during overcharge, the results were similar to those of Example ii) and no venting nor fire was observed. Cycle testing as in Example ii) was performed on two other additive containing batteries. The data for a representative battery is also shown in FIG. 3 and has capacity versus cycle number results that are similar to that of a conventional battery.

iv) Four 18650 batteries were assembled and overcharge tested as described in Example ii) above except that the electrolyte comprised a solvent mixture of ethylene carbonate (EC), diethyl carbonate (DEC), and ethyl methyl carbonate (EMC) in a volume ratio EC/DEC/EMC of 30/20/50 with 2% by volume 3-chlorothiophene additive. In all cases during overcharge, the results were similar to those of Example ii) and no venting nor fire was observed. Cycle testing as in Example ii) was performed on two other additive containing batteries and the capacity versus cycle number results were similar to that of a conventional battery.

v) Four 18650 batteries were assembled and overcharge tested as described in Example i) above except that the electrolyte comprised 2% by volume 3-bromothiophene additive. Again, in all cases, no venting nor fire was observed. Two other additive containing batteries were cycle tested. With this additive, the delivered capacity at cycle 50 was about half that of a conventional battery, indicating that although the additive was effective, it had some adverse affect on cycle life.

vi) Four 18650 batteries were assembled and overcharge tested as described in Example i) above except that the electrolyte comprised 1% by volume furan additive. In all cases, no venting nor fire was observed. Cycle testing as in Example i) was performed on two other additive containing batteries. The data for a representative battery is also shown in FIG. 3 and is similar to that for a conventional battery.

vi) Four 18650 batteries were assembled and overcharge tested as described in Example iv) above except that the electrolyte comprised 2.5% by weight biphenyl additive. (Note that biphenyl is a solid at room temperature and thus is conveniently quantified by weight rather than volume.) In all cases, neither venting nor fire was observed. FIG. 4 shows the voltage, temperature, and current data for a representative battery during overcharge.

viii) Four 18650 batteries were assembled and overcharge tested as described in Example i) above except that the electrolyte comprised 2% by volume 1,2 dimethoxybenzene additive. In all cases, violent venting and fire was observed. Two other additive containing batteries were cycle tested. With this additive, the delivered capacity at cycle 50 was about half that of a conventional battery, indicating that the additive had some adverse affect on cycle life.

These test results confirm that small amounts of the additives biphenyl, 3-chlorothiophene, and furan provide overcharge protection for certain particular battery systems without adversely affecting the cycle life characteristics. 3-bromothiophene additive also provides overcharge protection but can result in some observable loss in cycling capacity in this specific battery system. Thus, for the system tested, 3-bromothiophene is not preferred. The 2% level of 1,2 dimethoxybenzene additive is insufficient to protect the particular battery system tested (although 1,2 dimethoxybenzene is a potential candidate based on the polymerization voltage) yet is sufficient to adversely affect cycle life. 1,2 dimethoxybenzene appears not to be suitable for the specific battery system tested.

ILLUSTRATIVE EXAMPLES a) 3-chlorothiophene was heated in an oven at 130° C. (just below the boiling point) for two hours. There was no evidence of polymer formation. Accordingly, 3-chlorothiophene does not seem to polymerize thermally at temperatures up to the boiling point.

b) A laboratory coin cell battery was constructed with conventional 2325 hardware and with assembly taking place in a dry room but otherwise as described in J. R. Dahn et al, Electrochimica Acta, 38, 1179 (1993). 125 $\mu$m thick lithium metal foil was used as the anode. Celgard 2502 microporous polypropylene film was used as the separator. The bare corrosion resistant case itself was used as the cathode. The electrolyte used was that of Example ii). Cyclic voltammetry was performed and the current was seen to increase at about 4.8 volts as a result of the polymerization of the additive. Thus, the polymerization potential of 3-chlorothiophene in this electrochemical system appears to differ from that expected in Table 1. The coin cell battery was disassembled. Black polymer was observed on the cathode case and on the cathode side of the separator.

c) A laboratory coin cell battery was constructed as in Example b) except the electrolyte used was that of Example i) additionally comprising 2% by volume furan additive. Cyclic voltammetry was performed and the current was seen to increase at about 5.2 volts as a result of the polymerization of the additive. The coin cell battery was disassembled and polymer formation was observed on the case cathode and on the cathode side of the separator.

d) A laboratory coin cell battery was constructed as in Example b) except the electrolyte was 1M LiPF$_6$ in dioxolane solvent only. Cyclic voltammetry was performed up to 5.9 volts. The coin cell battery was disassembled. No polymer formation was observed. In this electrochemical system, dioxolane does not appear to polymerize electrochemically.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-aqueous rechargeable lithium ion battery having a maximum operating charging voltage and overcharge protection comprising:

a lithium insertion compound cathode;

a lithium insertion compound anode;

a separator;

a non-aqueous liquid electrolyte incapable of polymerizing at voltages greater than the maximum operating voltage of the lithium ion battery such that the battery is protected during overcharge abuse; and a monomer additive mixed in said liquid electrolyte, said additive polymerizing at battery voltages greater than the maximum operating voltage thereby increasing the internal resistance of the lithium ion battery and protecting the battery during overcharge abuse.

2. A non-aqueous rechargeable lithium battery as claimed in claim 1 wherein the monomer additive comprises less than about 5% by volume of the mixture of liquid electrolyte and monomer.

3. A non-aqueous rechargeable lithium ion battery having a maximum operating charging voltage and overcharge protection comprising:

a lithium insertion compound cathode;

a lithium insertion compound anode;

a separator;

a non-aqueous liquid electrolyte incapable of polymerizing at voltages greater than the maximum operating voltage of the lithium ion battery such that the battery is protected during overcharge abuse; and an aromatic additive mixed in said liquid electrolyte, said additive polymerizing at battery voltages greater than the maximum operating voltage thereby increasing the internal resistance of the lithium ion battery and protecting the battery during overcharge abuse.

4. A non-aqueous rechargeable lithium battery as claimed in claim 2 wherein the aromatic additive comprises about 1% to 4% additive by volume of the mixture of liquid electrolyte and aromatic additive.

5. A non-aqueous rechargeable lithium battery as claimed in claim 4 wherein the aromatic additive is biphenyl.

6. A non-aqueous rechargeable lithium battery as claimed in claim 5 wherein the biphenyl additive comprises about 2.5% by weight of the mixture of liquid electrolyte and biphenyl.

7. A non-aqueous rechargeable lithium battery as claimed in claim 4 wherein the aromatic additive is 3-R-thiophene wherein R is a halogen selected from the group consisting of bromine, chlorine, or fluorine.

8. A non-aqueous rechargeable lithium battery as claimed in claim 3 wherein the aromatic additive is 3-chloro-thiophene.

9. A non-aqueous rechargeable lithium battery as claimed in claim 8 wherein the 3-chloro-thiophene additive comprises about 2% to 4% 3 by volume of the mixture of liquid electrolyte and 3-chloro-thiophene.

10. A non-aqueous rechargeable lithium battery as claimed in claim 4 wherein the aromatic additive is furan.

11. A non-aqueous rechargeable lithium battery as claimed in claim 10 wherein the aromatic additive comprises about 1% furan by volume of the mixture of liquid electrolyte and furan.

12. A non-aqueous rechargeable lithium battery as claimed in claim 2 or 3 wherein the maximum operating charging voltage is greater than 4 volts.

13. A non-aqueous rechargeable lithium battery as claimed in claim 2 or 3 wherein the lithium insertion compound cathode is $Li_xMn_2O_4$.

14. A non-aqueous rechargeable lithium battery as claimed in claim 2 or 3 wherein the lithium insertion compound cathode is selected from the group consisting of $Li_xCoO_2$ and $Li_xNiO_2$.

15. A non-aqueous rechargeable lithium battery as claimed in claim 2 or 3 wherein the lithium insertion compound anode is a carbonaceous compound.

16. A non-aqueous rechargeable lithium battery as claimed in claim 2 or 3 wherein the liquid electrolyte comprises ethylene carbonate and diethyl carbonate.

17. A non-aqueous rechargeable lithium battery as claimed in claim 2 or 3 wherein the liquid electrolyte comprises ethylene carbonate, diethyl carbonate and methyl ethyl carbonate.

18. A non-aqueous rechargeable lithium battery as claimed in claim 2 or 3 wherein the liquid electrolyte comprises $LiPF_6$.

19. A non-aqueous rechargeable lithium battery as claimed in claim 2 wherein a) the separator has a shutdown temperature such that the internal resistance of the battery is increased when the battery temperature exceeds the shutdown temperature thereby protecting the battery during thermal abuse; and b) the aromatic additive does not polymerize below the shutdown temperature.

20. A non-aqueous rechargeable lithium battery as claimed in claim 19 wherein the separator is a microporous polyolefin film and the shutdown temperature is about the melting point of the polyolefin film.

21. A non-aqueous rechargeable lithium battery as claimed in claim 20 wherein the polyolefin film is selected from the group consisting of polypropylene and polyethylene film.

22. A method for providing overcharge protection in a non-aqueous rechargeable lithium ion battery, the battery having a maximum operating charging voltage; a lithium insertion compound cathode; a lithium insertion compound anode; a separator; and a non-aqueous liquid electrolyte incapable of polymerizing at voltages greater than the maximum operating voltage of the battery such that the battery is protected during overcharge abuse, which comprises:

a) selecting a monomer additive that polymerizes at lithium ion battery voltages greater than the maximum operating voltage of the battery;

b) mixing an amount of the monomer additive in said liquid electrolyte in an amount that is sufficient to increase the internal resistance of the lithium ion battery and protect the battery when the monomer additive polymerizes during overcharge abuse.

23. A method as claimed in claim 22 wherein the monomer additive comprises less than about 5% additive by volume of the mixture of liquid electrolyte and monomer additive.

24. A method as claimed in claim 22 wherein the monomer additive is aromatic.

25. A method as claimed in claim 24 wherein the amount of the aromatic additive comprises about 1% to 4% by volume of the additive electrolyte mixture.

26. A method as claimed in claim 22 wherein the aromatic additive is biphenyl.

27. A method as claimed in claim 26 wherein the biphenyl additive comprises about 2.5% by weight of the mixture of liquid electrolyte and biphenyl.

28. A method as claimed in claim 25 wherein the aromatic additive is 3-R-thiophene wherein R is a halogen selected from the group consisting of bromine, chlorine, or fluorine.

29. A method as claimed in claim 28 wherein the aromatic additive is 3-chloro-thiophene.

30. A method as claimed in claim 29 wherein the amount of the 3-chloro-thiophene is about 2% to 4% by volume of the 3-chloro-thiophene, electrolyte mixture.

31. A method as claimed in claim 25 wherein the aromatic additive is furan.

32. A method as claimed in claim 31 wherein the amount of the furan is about 1% by volume of the furan, electrolyte mixture.

33. A method as claimed in claim 24 wherein the maximum operating charging voltage is greater than 4 volts.

34. A method as claimed in claim 24 wherein the lithium insertion compound cathode is $Li_xMn_2O_4$.

35. A method as claimed in claim 24 wherein the lithium insertion compound anode is a carbonaceous compound.

36. A method as claimed in claim 24 wherein the liquid electrolyte comprises ethylene carbonate and diethyl carbonate.

37. A method as claimed in claim 36 wherein the liquid electrolyte additionally comprises methyl ethyl carbonate.

38. A method as claimed in claim 24 wherein the liquid electrolyte comprises $LiPF_6$.

39. A method for providing overcharge and overtemperature protection in a non-aqueous rechargeable lithium ion battery, the battery having a maximum operating charging voltage; a lithium insertion compound cathode; a lithium insertion compound anode; a separator having a shutdown temperature such that the internal resistance of the lithium ion battery is increased when the battery temperature exceeds the shutdown temperature thereby protecting the battery during thermal abuse; and a non-aqueous liquid electrolyte incapable of polymerizing at voltages greater than the maximum operating voltage such that the lithium ion battery is protected during overcharge abuse, which comprises mixing an aromatic additive that polymerizes at battery voltages greater than the maximum operating voltage and that does not polymerize below the shutdown temperature in said liquid electrolyte wherein the amount of said additive is sufficient to increase the internal resistance of the lithium ion battery and protect the battery after the aromatic additive polymerizes during overcharge abuse.

40. A method as claimed in claim 39 wherein the separator is a microporous polyolefin film and the shutdown temperature is about the melting point of the polyolefin film.

41. A method as claimed in claim 40 wherein the polyolefin film is selected from the group consisting of polypropylene and polyethylene film.

42. A non-aqueous rechargeable lithium battery having a maximum operating charging voltage comprising:
   a lithium insertion compound cathode;
   a lithium or lithium compound anode;
   a separator;
   a non-aqueous liquid electrolyte incapable of polymerizing at voltages greater than the maximum operating voltage of the battery such that the battery is protected during overcharge abuse; and
   an aromatic additive selected from the group consisting of biphenyl and 3-R-thiophene wherein R is bromine, chlorine or fluorine, said additive mixed in said liquid electrolyte, said additive polymerizing at battery voltages greater than the maximum operating voltage thereby increasing the internal resistance of the battery and protecting the battery during overcharge abuse.

43. A non-aqueous rechargeable lithium battery as claimed in claim 42 wherein the aromatic additive comprises about 1% to 4% additive by volume of the mixture of liquid electrolyte and aromatic additive.

44. A non-aqueous rechargeable lithium battery as claimed in claim 42 wherein the aromatic additive is biphenyl.

45. A non-aqueous rechargeable lithium battery as claimed in claim 42 wherein the additive is biphenyl and the biphenyl additive comprises about 2.5% by weight of the mixture of liquid electrolyte and biphenyl.

46. A non-aqueous rechargeable lithium battery as claimed in claim 42 wherein the aromatic additive is 3-R-thiophene wherein R is a halogen selected from the group consisting of bromine, chlorine, or fluorine.

47. A non-aqueous rechargeable lithium battery as claimed in claim 42 wherein the aromatic additive is 3-chloro-thiophene.

48. A non-aqueous rechargeable lithium battery as claimed in claim 42 wherein the 3-chloro-thiophene additive comprises about 2% to 4% by volume of the mixture of liquid electrolyte and 3-chloro-thiophene.

49. A non-aqueous rechargeable lithium battery as claimed in claim 42 wherein the maximum operating charging voltage is greater than 4 volts.

50. A non-aqueous rechargeable lithium battery as claimed in claim 42 wherein the lithium insertion compound cathode is $Li_xMn_2O_4$.

51. A non-aqueous rechargeable lithium battery as claimed in claim 42 wherein the lithium insertion compound cathode is selected from the group consisting of $Li_xCoO_2$ and $Li_xNiO_2$.

52. A non-aqueous rechargeable lithium battery as claimed in claim 42 wherein the liquid electrolyte comprises ethylene carbonate and diethyl carbonate.

53. A non-aqueous rechargeable lithium battery as claimed in claim 42 wherein the liquid electrolyte comprises ethylene carbonate, diethyl carbonate and methyl ethyl carbonate.

54. A non-aqueous rechargeable lithium battery as claimed in claim 42 wherein the liquid electrolyte comprises $LiPF_6$.

55. A non-aqueous rechargeable lithium battery as claimed in claim 42 wherein
   a) the separator has a shutdown temperature such that the internal resistance of the battery is increased when the battery temperature exceeds the shutdown temperature thereby protecting the battery during thermal abuse; and
   b) the aromatic additive does not polymerize below the shutdown temperature.

56. A non-aqueous rechargeable lithium battery as claimed in claim 55 wherein the separator is a microporous polyolefin film and the shutdown temperature is about the melting point of the polyolefin film.

57. A non-aqueous rechargeable lithium battery as claimed in claim 56 wherein the polyolefin film is selected from the group consisting of polypropylene and polyethylene film.

58. A method for providing overcharge protection in a non-aqueous rechargeable lithium battery, the battery having a maximum operating charging voltage; a lithium insertion compound cathode; a lithium or lithium compound anode; a separator; and a non-aqueous liquid electrolyte incapable of polymerizing at voltages greater than the maximum operating voltage of the battery such that the battery is protected during overcharge abuse, which comprises:
   a) selecting an aromatic additive that polymerizes at battery voltages greater than the maximum operating voltage of the battery, said aromatic additive being selected from the group consisting of biphenyl and 3-R-thiophene wherein R is bromine, chlorine or fluorine;
   b) mixing an amount of the aromatic additive in said liquid electrolyte in an amount that is sufficient to increase the internal resistance of the battery and protect the battery when the monomer additive polymerizes during overcharge abuse.

59. A method as claimed in claim 58 wherein the amount of aromatic additive comprises about 1% to 4% by volume of the additive electrolyte mixture.

60. A method as claimed in claim 58 wherein the aromatic additive is biphenyl.

61. A method as claimed in claim 60 wherein the biphenyl additive comprises about 2.5% by weight of the mixture of liquid electrolyte and biphenyl.

62. A method as claimed in claim 58 wherein the aromatic additive is 3-R-thiophene wherein R is a halogen selected from the group consisting of bromine, chlorine, or fluorine.

63. A method as claimed in claim 62 wherein the aromatic additive is 3-chloro-thiophene.

64. A method as claimed in claim 63 wherein the amount of the 3-chloro-thiophene is about 2% to 4% by volume of the 3-chloro-thiophene, electrolyte mixture.

65. A method as claimed in claim 58 wherein the maximum operating charging voltage is greater than 4 volts.

66. A method as claimed in claim 58 wherein the lithium insertion compound cathode is $Li_xMn_2O_4$.

67. A method as claimed in claim 58 wherein the liquid electrolyte comprises ethylene carbonate and diethyl carbonate.

68. A method as claimed in claim 67 wherein the liquid electrolyte additionally comprises methyl ethyl carbonate.

69. A method as claimed in claim 58 wherein the liquid electrolyte comprises $LiPF_6$.

70. A method for providing overcharge and overtemperature protection in a non-aqueous rechargeable lithium battery, the battery having a maximum operating charging voltage; a lithium insertion compound cathode; a lithium or lithium compound anode; a separator having a shutdown temperature such that the internal resistance of the battery is increased when the battery temperature exceeds the shutdown temperature thereby protecting the battery during thermal abuse; and a non-aqueous liquid electrolyte incapable of polymerizing at voltages greater than the maximum operating voltage such that the battery is protected during overcharge abuse, which comprises mixing an aromatic additive selected from the group consisting of biphenyl and 3-R-thiophene wherein R is bromine, chlorine or fluorine, said additive polymerizing at battery voltages greater than the maximum operating voltage and not polymerizing below the shutdown temperature in said liquid electrolyte wherein the amount of said additive is sufficient to increase the internal resistance of the battery and protect the battery after the aromatic additive polymerizes during overcharge abuse.

71. A method as claimed in claim 70 wherein the separator is a microporous polyolefin film and the shutdown temperature is about the melting point of the polyolefin film.

72. A method as claimed in claim 71 wherein the polyolefin film is selected from the group consisting of polypropylene and polyethylene film.

73. A non-aqueous rechargeable lithium battery having a maximum operating charging voltage and overcharge protection comprising:

a lithium insertion compound cathode;

a lithium or lithium compound anode;

a separator;

a non-aqueous liquid electrolyte comprising a solvent selected from the group consisting of ethylene carbonate, diethyl carbonate and methyl ethyl carbonate; and a monomer additive mixed in said liquid electrolyte, wherein said additive comprises about 1% to 4% additive by volume of the mixture of liquid electrolyte and additive, said additive polymerizing at battery voltages greater than the maximum operating voltage thereby increasing the internal resistance of the battery and protecting the battery during overcharge abuse.

74. A non-aqueous rechargeable lithium battery as claimed in claim 73 wherein the monomer additive is aromatic.

75. A non-aqueous rechargeable lithium battery as claimed in claim 74 wherein the aromatic additive is biphenyl.

76. A non-aqueous rechargeable lithium battery as claimed in claim 75 wherein the biphenyl additive comprises about 2.5% by weight of the mixture of liquid electrolyte and biphenyl.

77. A non-aqueous rechargeable lithium battery as claimed in claim 74 wherein the aromatic additive is 3-R-thiophene wherein R is a halogen selected from the group consisting of bromine, chlorine, or fluorine.

78. A non-aqueous rechargeable lithium battery as claimed in claim 77 wherein the aromatic additive is 3-chloro-thiophene.

79. A non-aqueous rechargeable lithium battery as claimed in claim 78 wherein the 3-chloro-thiophene additive comprises about 2% to 4% by volume of the mixture of liquid electrolyte and 3-chloro-thiophene.

80. A non-aqueous rechargeable lithium battery as claimed in claim 74 wherein the aromatic additive is furan.

81. A non-aqueous rechargeable lithium battery as claimed in claim 80 wherein the aromatic additive comprises about 1% furan by volume of the mixture of liquid electrolyte and furan.

82. A method for providing overcharge protection in a non-aqueous rechargeable lithium battery, without extending the cycle life of the battery, the battery having a maximum operating charging voltage; a lithium insertion compound cathode; a lithium or lithium compound anode; a separator; and a non-aqueous liquid electrolyte comprising a solvent selected from the group consisting of ethylene carbonate, diethyl carbonate and methyl ethyl carbonate which method comprises:

a) selecting a monomer additive that polymerizes at a battery voltages greater than the maximum operating voltage of the battery;

b) mixing an amount of the monomer additive in said liquid in an amount that comprises less than about 5% additive by volume of the mixture of liquid electrolyte and monomer additive and that is sufficient to increase the internal resistance of the battery and protect the battery when the monomer additive polymerizes during overcharge abuse.

83. A method as claimed in claim 82 wherein the monomer additive is aromatic.

84. A method as claimed in claim 83 wherein the amount of the aromatic additive comprises about 1% to 4% by volume of the additive electrolyte mixture.

85. A method as claimed in claim 83 wherein the aromatic additive is biphenyl.

86. A method as claimed in claim 85 wherein the biphenyl additive comprises about 2.5% by weight of the mixture of liquid electrolyte and biphenyl.

87. A method as claimed in claim 86 wherein the aromatic additive is 3-R-thiophene wherein R is a halogen selected from the group consisting of bromine, chlorine, or fluorine.

88. A method as claimed in claim 87 wherein the aromatic additive is 3-chloro-thiophene.

89. A method as claimed in claim 88 wherein the amount of the 3-chloro-thiophene is about 2% to 4% by volume of the 3-chloro-thiophene, electrolyte mixture.

90. A method as claimed in claim 89 wherein the aromatic additive is furan.

91. A method as claimed in claim 90 wherein the amount of the furan is about 1% by volume of the furan, electrolyte mixture.

92. A method for providing overcharge and overtemperature protection in a non-aqueous rechargeable lithium battery, without extending the cycle life of the battery, the battery having a maximum operating charging voltage; a lithium insertion compound cathode; a lithium or lithium compound anode; a separator having a shutdown temperature such that the internal resistance of the battery is increased when the battery temperature exceeds the shutdown temperature thereby protecting the battery during thermal abuse; and a non-aqueous liquid electrolyte comprising a solvent selected form the group consisting of ethylene carbonate, diethyl carbonate and methyl ethyl carbonate, which method comprises mixing an aromatic additive that polymerizes at battery voltages greater than the maximum operating voltage and that does not polymerize below the shutdown temperature in said liquid electrolyte wherein the amount of said additive comprises less than about 5% additive by volume of the mixture of liquid electrolyte and additive and is sufficient to increase the internal resistance of the battery and protect the battery after the aromatic additive polymerizes during overcharge abuse.

* * * * *